United States Patent [19]

Boissonnet

[11] 4,279,062
[45] Jul. 21, 1981

[54] SNAP SHACKLE

[75] Inventor: Michel Boissonnet, Thiers, France

[73] Assignee: Société à Responsabilité Limitée: Wichard, Thiers, France

[21] Appl. No.: 41,721

[22] Filed: May 23, 1979

[30] Foreign Application Priority Data

Apr. 4, 1979 [FR] France .................. 79 09230

[51] Int. Cl.³ .............. A44B 13/00; B64D 17/38
[52] U.S. Cl. .................. 24/305; 24/232 R; 24/371; 24/376; 294/83 R
[58] Field of Search ............ 24/73 SA, 73 SB, 73 SC, 24/233, 232 R, 235; 294/83 R, 84

[56] References Cited

U.S. PATENT DOCUMENTS

| 123,236 | 1/1872 | Cathcart | 24/232 |
|---|---|---|---|
| 860,178 | 7/1907 | Ziegler | 24/233 |
| 878,060 | 2/1908 | Hammond | 294/83 R |
| 1,079,297 | 11/1913 | Jacques | 294/84 |
| 1,086,609 | 2/1914 | Nilson | 294/83 R |
| 1,251,531 | 1/1918 | Hunt | 294/83 R |
| 1,521,811 | 1/1925 | Hartbauer | 24/233 |
| 2,562,401 | 7/1951 | Wheeler | 24/233 |
| 3,038,753 | 6/1962 | Seager | 294/83 R |
| 3,798,716 | 3/1974 | Klein | 24/233 |
| 4,093,293 | 6/1978 | Huggett | 294/83 R |

FOREIGN PATENT DOCUMENTS

| 537878 | 6/1954 | Italy | 294/83 R |
|---|---|---|---|
| 360191 | 11/1931 | United Kingdom | 294/83 R |

*Primary Examiner*—Victor N. Sakran
*Attorney, Agent, or Firm*—Karl F. Ross

[57] ABSTRACT

A snap shackle has a body formed on one side with an attachment such as a swivel eye and on the other side with a C-shaped arm having an outer end forming a pivot for a complementarily shaped pivotal arm whose free end in turn is engageable against the shackle body to form another eye. A latch constituted as a stirrup pivotal about an axis parallel to the pivot axis of the pivotal arm is mounted on the shackle body and has a bight that can engage in a holding position over the free end of the pivotal arm to hold it in a closed position. This arm can be springy in such a manner that it seeks the holding position, or can be biased by a spring into the holding position. A trip line attached to the stirrup can displace it into a freeing position in which it allows the pivotal arm to swing away from the body and open up the shackle.

11 Claims, 6 Drawing Figures

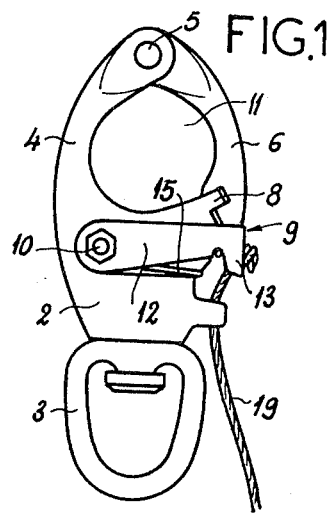
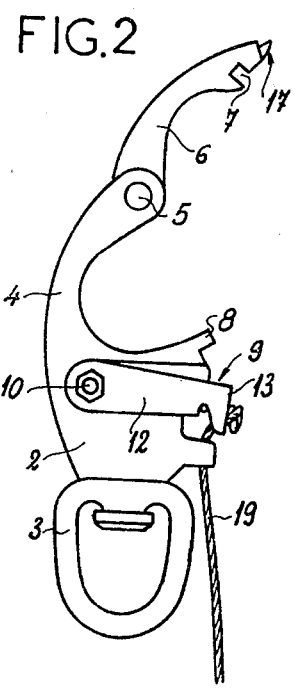
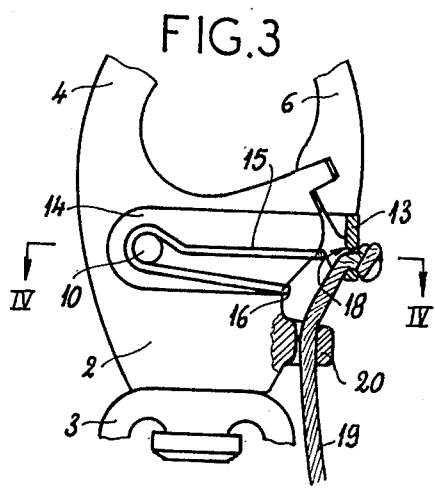
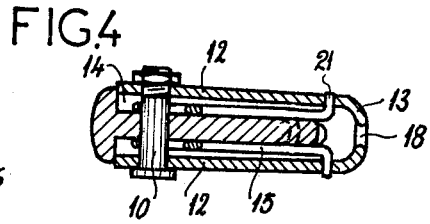
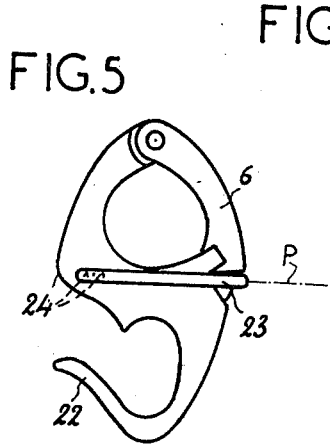
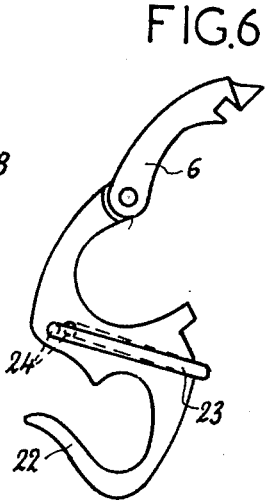

SNAP SHACKLE

FIELD OF THE INVENTION

The present invention relates to a snap shackle of the type used on a sailboat.

BACKGROUND OF THE INVENTION

A snap shackle such as is used on a sailboat has a shackle body provided on one side with an eye to which one object—a trapeze harness, jib luff, sheet, halyard, or the like—is attached and another side forming an openable eye to which another object—a deck or mast eye, another line, or the like—is attached. Normally this openable eye is formed between a pair of arms, one of which is unitarily formed with the shackle body and the other of which can pivot between an open and closed position. Latching mechanism is provided on the shackle body for securing the pivotal arm to it when in the closed position.

The most common snap shackle has a spring-loaded pin displaceable in the shackle body in a direction transverse to the plane of the openable eye. The pivotal arm of the openable eye is formed at its free end with a hole that can interfit with the end of this pin to hold this eye closed. When the pin is moved against the force of its spring it leaves the hole in the pivotal arm and releases it to pivot back to the open position.

A common problem with such snap shackles is opening them under load. Frequently the pivotal arm is J-shaped, with the end of its short leg pivoted on the outer end of the fixed arm formed on the shackle body, and the locking mechanism engaging the end of its long leg. Thus even when open such a shackle can remain hooked on the object it is secured to. This can be particularly hazardous when connected to a trapeze harness, as a submerged user can be held under the water by his equipment even after the shackle is opened. Similarly such devices frequently require an inordinate amount of force to open them when heavily loaded, as a component of the force being exerted through the shackle is effective on the opening mechanism in a direction making it difficult to actuate.

Finally it is usual that such shackles are very expensive, particularly due to the high cost of bronze or stainless steel from which they are made and the complexity of the opening mechanism. The machining of the shackle body that receives the piston-type or button-type opener is an expensive procedure that considerably elevates the cost of the fitting. When a plurality of snap shackles are provided along the luff of a jib to secure it to the respective stay, the expense can be vey great.

OBJECTS OF THE INVENTION

It is therefore an object of the present invention to provide an improved snap shackle.

Another object is the provision of a snap shackle of simple and inexpensive construction.

A further object is to provide a snap shackle which can open easily under load, and which can even be provided with a trip line if desired.

SUMMARY OF THE INVENTION

These objects are attained according to the instant invention in a snap shackle having a shackle body formed with a fixed arm extending in one direction from the side of the body opposite the attachment for the one object to be secured to the shackle. This fixed arm has an outer end defining an outer pivot axis. A movable arm is pivoted on the outer end of the fixed arm at the outer pivot axis and has a free end engageable with a portion of the body. This movable arm is pivotal about the outer axis between an open position extending away from the body in the one direction and a closed position forming an openable eye with the fixed arm and with the free end engaging the body portion, so that another object can be secured to this openable eye. According to this invention a retainer stirrup is pivotal on the body about a stirrup axis generally parallel to the outer axis and having a bight displaceable between a holding position engaging around the free end of the arm in the closed position thereof to retain this movable arm in this closed position, and a freeing position disengaged from this free end and permitting the movable arm to pivot freely about the outer axis. Biasing means is provided for urging the stirrup into the holding position.

Thus according to this invention a pivotal retainer stirrup is provided for holding the movable arm in the closed position. Such an arrangement is substantially simpler and easier to manufacture than the conventional slide-type or rotary retainers, and has the considerable advantage that only a very small component of the force being exerted between the objects secured to the shackle of this invention will be effective in a direction impeding pulling-away of this stirrup from the free end of the movable arm. Even when heavily loaded such a shackle can be opened with ease.

According to further features of this invention the outer pivot axis is generally at the farthest parts of the two arms forming the openable eye in the closed position of this eye, so that the openable eye will surely and completely open to release the object it is connected to when the stirrup is moved into the freeing position. The possibility of the shackle being hung up on some part of the rigging is completely eliminated.

In accordance with the instant invention the stirrup is unitarily formed of an elastically deformable wire having a pair of legs each having a bent-in foot. One of these feet is fitted at the stirrup axis into a hole formed in the shackle body, and the other foot is fitted into a second hole parallel to this first-mentioned hole, but offset therefrom in a plane including the entire stirrup in the holding position thereof. The stirrup naturally lies in a plane, so when displaced into the freeing position it is deformed, and will naturally seek by its own resilience to return to the holding position. Thus the other leg with its respective foot and hole constitute the biasing means along with the inherent resiliency of the stirrup wire. Such an arrangement can be produced at extremely low cost, and at the same time will operate well for a long time since little can go wrong when there are only three moving parts.

It is also possible according to this invention to form the stirrup as a single rigid piece from sheet metal, with a pivot bolt extending through the shackle body forming the stirrup pivot and defining the stirrup axis. In this case a double hairpin spring is provided with each hairpin having its loop fitted over the respective end of the pivot bolt, its one leg hooked on the shackle body, and its other leg hooked on the respective leg of the stirrup. These one legs of the two hairpins are joined together and the shackle is formed on its opposite faces with outwardly open recesses so each hairpin can be contained in the respective recess under the respective leg of the stirrup. In this manner a very heavy duty and rugged assembly is produced.

It is possible according to yet another feature of the present invention to provide such a shackle with a trip line. Such a trip line is connected to the bight of the latch stirrup, and may pass through an eye formed in the shackle body. In this manner remote tripping of the shackle is a relatively simple task, which would, for instance, greatly ease handling of a spinnaker.

BRIEF DESCRIPTION OF THE DRAWING

FIGS. 1 and 2 are side views respectively showing the shackle according to this invention in the closed and open positions;

FIG. 3 is a large-scale view, partly broken away, of a detail of the shackle according to the instant invention;

FIG. 4 is a section taken along line IV—IV of FIG. 3; and

FIGS. 5 and 6 are views similar to those of FIGS. 1 and 2, respectively, showing another shackle according to the instant invention, in the closed and open positions.

SPECIFIC DESCRIPTION

As seen in FIGS. 1-4 a snap shackle according to the instant invention has a one-piece shackle body 2 formed of a corrosion-resistant metal such as bronze or stainless steel. This body 2 is provided on one side with an attachment, here a swivel eye 3, and is formed on its other side with an arcuate fixed arm 4 carrying at its outer end a transverse pivot pin 5. A pivotal arm 6 of complementary shape to the arm 4 is carried on this pivot 5 and can move from the closed position of FIG. 1, in which it forms a closed eye 11, to the open position of FIG. 2, in which any object such as a cable loop will pull out of the eye 11.

The arm 6 is formed adjacent its free end with an inwardly open rectangular-section cutout 7 snugly fittable over a complementary projection 8 formed on the shackle body 2. This cutout 6 opens angularly of the axis of the pivot 5. Thus the eye 11, when closed, can be used for transmitting a considerable tension, since the interfitting cutout 7 and projection 8 will solidly unite the arm 6 with the body 2.

A latch is provided on the shackle body 2, comprising a stirrup 9 mounted on a pivot bolt 10 extending through the body 2 parallel to the pivot 5. This stirrup 9 is formed of corrosion-resistant sheet metal and has a pair of legs 12 extending parallel to each other and perpendicular to the axis of the pivot 10, and a bight 13 joining the outer ends of these two legs 12. Underneath each leg 12, as seen in FIG. 3, the shackle 2 is formed with an outwardly open cutout 14 receiving a hairpin spring 15. Each such spring 15 is looped over the respective end of the pivot bolt 10 and has one leg joined at a bight portion 16 to the one leg of the other spring 15 and another leg formed with a bent-out tip 21 engaging in a cutout formed in the under edge of the respective stirrup leg 12 in such a manner as to urge the stirrup 12 counterclockwise and upwardly as seen in FIGS. 1-3, into the holding position of FIGS. 1 and 3. In this position a tip 17 of the free end of the arm 6 is captured within the bight 13 and bears flatly thereagainst.

The bight 13 of the stirrup 9 is also formed with a radially throughgoing hole 18 receiving one end of a trip line 19 threaded through an eye 20 formed unitarily with the body 2 underneath the stirrup 9. Thus a pull exerted on the line 19 in any direction will be able to move the stirrup 9 against the force of its springs 15 from the holding position of FIGS. 1 and 3 to the freeing position of FIG. 2.

FIGS. 5 and 6 show a similar snap shackle particularly made for use as a hank on the luff of a jib. To this end the shackle has an attachment formed as a deformable tongue 22 adapted to be inserted through an eye of the luff and then bent closed to permanently mount the fitting on the jib. The stirrup 23 here is formed of a single piece of highly resilient stainless-steel (incalloy) wire shaped so that it naturally lies in a plane P, but with two bent-in feet 24 which are offset in this plane P and received in respective parallel blind pivot holes of the shackle body. Thus, when bent into the freeing position of FIG. 6, the stirrup 23 will seek to return to is holding position of FIG. 5. In this embodiment one of the legs and its respective offset pivot can be considered to be the biasing means resiliently urging the entire stirrup into the holding position.

The snap shackle shown above can be used for any of the purposes described, and for others that will occur to the person skilled in the art. It would be possible, for example, to mount the device directly on a block, as for use in a boom vang, in which case the lower swivel eye 3 (FIGS. 1-4) or deformable tongue 22 (FIGS. 5 and 6) would be replaced by the body of the block.

I claim:

1. A snap shackle comprising:
   a shackle body;
   an attachment on one said of said of said body, whereby an object can be secured to said one side at said attachment;
   a fixed arm extending in one direction from the other side of said body and having an outer end defining an outer pivot axis;
   a movable arm pivoted on said outer end of said fixed arm at said outer pivot axis and having a free and engageable with a portion of said body, said movable arm being pivotal about said outer axis between an open position extending away from said body in said one direction and a closed position forming an eye with said fixed arm and with said free end engaging said portion, whereby another object can be secured to the eye formed by this movable arm;
   a retainer stirrup pivotal on said body about a stirrup axis generally parallel to said outer axis and having
      a pair of legs each having a pair of ends one of which is formed with a foot pivoted on said body, one of said feet at least lying at said stirrup axis, and
      a bight interconnecting the other ends of said legs and displaceable between a holding position with said bight engaging around and said legs flanking said free end in said closed position, and a freeing position disengaged from said free end and permitting said movable arm to pivot freely about said outer axis; and
   biasing means for urging said stirrup into said holding position.

2. The shackle defined in claim 1 wherein said feet are a pair of legs each are bent-in, one of journaled in said body at said said body being formed radially offset from said stirrup axis with an oppositely open pivot hole receiving the other foot of said stirrup and constituting therewith said biasing means, said stirrup being formed of an elastically deformable wire and being elastically more deformed in said freeing position than in said holding position.

3. The shackle defined in claim 1 wherein both of said feet are a pair of legs each having journaled in said body at said stirrup axis, said biasing means including a spring braced between said body and said stirrup.

4. The shackle defined in claim 3 wherein said spring is a double hairpin spring having spring ends braced against said stirrup at said bight.

5. The shackle defined in claim 4 wherein said body has a pair of oppositely axially outwardly open recesses each receiving part of said spring and each underneath a respective leg of said stirrup.

6. The shackle defined in claim 1, further comprising a trip line attached to said stirrup remote from said stirrup axis.

7. The shackle defined in claim 6 wherein said trip line is connected to said stirrup at said bight.

8. The shackle defined in claim 6 wherein said body is formed to said one side of said stirrup with an eye through which said trip line passes.

9. The shackle defined in claim 1 wherein said movable arm has a tip received in said bight in said closed and holding positions.

10. The shackle defined in claim 1 wherein said movable arm is formed with a cutout, said body being formed at its said portion with a projection received in said cutout in said closed position of said movable arm to stabilize same.

11. A snap shackle comprising:
a shackle body;
an attachment on one side of said body, whereby an object can be secured to said one side at said attachment;
a fixed arm extending in one direction from the other side of said body and having an outer end defining an outer pivot axis;
a movable arm pivoted on said outer end of said fixed arm at said outer pivot axis and having a free end engageable with a portion of said body, said movable arm being pivotal about said outer axis between an open position extending away from said body in said one direction and a closed position forming an eye with said fixed arm and with said free end engaging said portion, whereby another object can be secured to the eye formed by this movable arm; and
a retainer stirrup formed of an elastically deformable wire and pivotal on said body about a stirrup axis generally parallel to said outer axis, said stirrup having
    a pair of legs each having a bent-in foot, one of said feet being journaled in said body at said stirrup axis and the other of said feet being journaled in said body offset from said stirrup axis, and
    a bight interconnecting said legs opposite said feet and displaceable between a holding position with said bight engaging around said free end in said closed position and a freeing position disengaged from said free end and permitting said movable arm to pivot freely about said outer axis, said wire being substantially more elastically deformed in said freeing position than in said holding position, whereby the elasticity of said stirrup biases it into said holding position.

* * * * *